United States Patent [19]

McMahan, Jr.

[11] 4,361,383
[45] Nov. 30, 1982

[54] LASER BEAM DIRECTIONAL DEVIATION AND NOISE STABILIZATION DEVICE

[75] Inventor: Robert K. McMahan, Jr., Winter Park, Fla.

[73] Assignee: The United States of America as represented by the Secretary of the Navy, Washington, D.C.

[21] Appl. No.: 180,538

[22] Filed: Aug. 22, 1980

[51] Int. Cl.³ .............................................. G02B 27/46
[52] U.S. Cl. .................................. 350/162.12; 350/358
[58] Field of Search ................. 350/162 SF, 384, 358, 350/3.8

[56] References Cited

U.S. PATENT DOCUMENTS

| | | | |
|---|---|---|---|
| 3,273,458 | 9/1966 | Kohler | 350/384 |
| 3,688,101 | 8/1972 | Henning | 350/162 SF |
| 3,729,634 | 4/1973 | Jensen et al. | 350/162 SF |
| 3,900,851 | 8/1975 | Bucy et al. | 350/358 |

OTHER PUBLICATIONS

*Electro-Optical Systems Design*, vol. 6, No. 2, Feb. 1974, p. 23, Nowicki, T., "A–O and E–O Modulators Basics and Comparisons".

*Primary Examiner*—John K. Corbin
*Assistant Examiner*—George P. Chambers
*Attorney, Agent, or Firm*—Robert F. Beers; Robert W. Adams; David S. Kalmbaugh

[57] ABSTRACT

A laser beam directional deviation and noise stabilization device is disclosed as incorporating a laser which broadcast a monochromatic laser light beam along a predetermined optical path, and a plurality of optical elements which eliminate from the laser light beam any beam wander, and power level fluctuations inherent within the laser light beam.

11 Claims, 3 Drawing Figures

LASER BEAM DIRECTIONAL DEVIATION AND NOISE STABILIZATION DEVICE

BACKGROUND OF THE INVENTION

1. Field of the Invention

This invention relates generally to laser beam generating apparatus. In particular, this invention relates to a device for removing from a monochromatic laser light beam broadcast along a predetermined optical path any directional deviation inherent therein, and for stabilizing the output power of the monochromatic laser light beam.

2. Description of the Prior Art

At present, commercially available lasers are not sufficiently stable for their inclusion within complex laser light visual display training systems. The laser light beams broadcast by such lasers are generally unstable from the standpoints of beam directional deviations, and output power fluctuations. This, in turn, results in the severe distortion of any visual image generated by the aforementioned laser light visual display training systems such that the ability of these visual display training systems to be incorporated into realisitc battlefield training situations and the like is greatly impaired. In addition, when multiple lasers are incorporated in a visual display training system, there is an overlapping of the images broadcast by each laser such that the visual image generated by the visual display system is severely distorted.

There are available a variety of devices to correct the directional deviation inherent within the monochromatic laser light beams emitted by most lasers. Such devices include Brewster window chillers, pure gas purges, and the like. However, the devices of the prior art ordinarily leave something to be desired, especially from the standpoints of design complexity, expense necessary to modify a laser so to incorporate the aforementioned devices therein, and beam directional accuracy. In addition, some lasers cannot be modified to incorporate such devices therein.

Generally, light regulation circuits have been incorporated within commercially available laser to correct for the output power fluctuations inherent therein. However, such devices of the prior art ordinarily leave something to be desired, especially from the standpoints of design complexity, and power fluctuation elimination efficiency.

SUMMARY OF THE INVENTION

The subject invention overcomes some of the disadvantages of the prior art, including those mentioned above, in that it comprises a relatively simple device for eliminating from a monochromatic laser light beam broadcast along a predetermined optical path any directional deviation inherent therein and for stabilizing the output power thereof.

Included in the subject invention is a laser for projecting along the predetermined optical path the monochromatic laser light beam, a spatially filtered collimator for collimating the aforementioned monochromatic laser light beam so as to form a collimated monochromatic laser light beam having any beam directional deviation eliminated therefrom, and a galilean collimator for reconstructing the collimated monochromatic laser light beam such that the reconstructed monochromatic laser light beam has a diameter identical to that of the monochromatic laser light beam projected by the laser. A broadband electro-optic feedback loop servomechanism then stabilizes the output power of the reconstructed monochromatic laser light beam by eliminating therefrom any power level deviations and noise inherent therein.

DESCRIPTION OF THE PREFERRED EMBODIMENT

Figure 1:
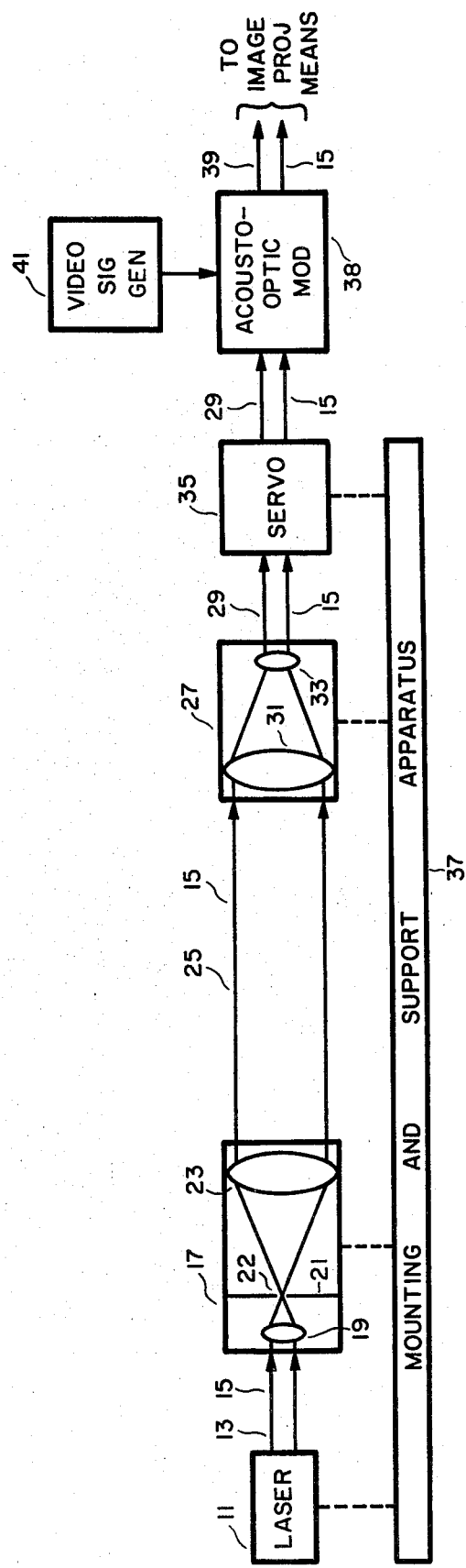
FIG. 1 is a schematic representation of the laser beam directional deviation and noise stabilization device constituting the subject invention.

The preferred embodiment of the subject invention will now be discussed in some detail in conjunction with the drawing, wherein like parts are designated by like reference numerals insofar as it is practical to do so.

Referring now to FIG. 1, there is shown a laser light source 11 which emits a narrow beam of monochromatic laser light 13 having a beam diameter of one and one half millimeters along a predetermined optical or light path 15.

Spatially disposed along laser light path 15 downstream from laser light source 11 is a spatially filtered collimator 17 which comprises a lens 19, a spatial filter 21 located at the focal point of lens 19, an aperture 22 within spatial filter 21, and a lens 23 located at a distance from spatial filter 21 equal to the focal length of lens 23.

As will be discussed more fully below, the function of spatially filtered collimator 17 is to collimate laser light beam 13 so as to form a collimated monochromatic laser light beam 25 which has removed therefrom any directional deviation or beam wander inherent within laser light beam 13. In addition, it may be noteworthy to mention that spatially filtered collimator 17 may be a laser collimator Model 280-100 manufactured by Tropel, Inc. of Fairport, N.Y.

Spatially disposed downstream from spatially filtered collimator 17 along optical light path 15 is a galilean collimator 27 which reconstructs laser light beam 25 so as to form a monochromatic laser light beam 29, the beam diameter of which is the same as the diameter of laser light beam 13.

Galilean collimator 27 includes a lens 31 positioned at the end thereof which receives laser light beam 25, and a lens 33 positioned at the end thereof which transmits laser light beam 29 along optical light path 15. In addition, galilean collimator 27 may be a collimator Model 280-100G manufactured by Tropel, Inc.

Spatially disposed downstream from galilean collimator 27 along optical light path 15 is broadband electro-optic feedback loop servomechanism 35, the function of which is to stabilize laser light beam 29 by elimination therefrom any power level deviations and noise inherent therein. Servomechanism 35 may be a broadband electro-optic feedback loop Model 307 manufactured by Coherent Associates of Danbury, Connecticut.

All of the aforementioned elements of the subject invention are connected to a mounting and support apparatus 37 by appropriate attachment means, as respectively represented by the dashed lines therebetween. Mounting and support apparatus 37 and the aforementioned attachment means utilized therewith may be, for example, an optical bench Model L360NB manufactured by Gaertner, Inc. of Chicago, Ill.

Spatially disposed downstream from servomechanism 35 along optical light path 15 is an acousto-optic modulator 38, the function of which is to combine a video information signal with laser light beam 29 so as to form an image transmitting laser light beam 39. Laser light beam 39 is then transmitted along optical light path 15 to image projecting means, not shown, which broadcast laser light beam 39 on a reflective display screen, not shown, so as to form a visual image thereon.

The aforementioned video signal is provided by a video signal generator 41, the output of which is connected to the input of acousto-optic modulator 38. Video signal generator 41 may be, for example, any conventional television receiver which is commercially available from several different sources.

The operation of the subject invention will now be discussed in conjunction with all of the Figures of the drawing.

Referring now to FIG. 1, the narrow beam of monochromatic laser light 13 is broadcast along optical light path 15 through lens 19 which narrows laser light beam 13 so as to allow laser light beam 13 to pass through aperture 22 of spatial filter 21 to lens 23. Lens 23, in turn, collimates laser light beam 13 so to form collimated laser light beam 25 which has removed therefrom any directional deviation inherent within laser light beam 13.

At this time, it may be noteworthy to mention that collimated laser light beam 25, which has an expanded beam diameter of approximately one hundred fifty millimeters, may be transmitted over long distances with very little transmission induced beam power attenuation. This, in turn, allows for the utilization of the subject invention in a variety of visual display training systems in which laser light must be transmitted over long distances.

Collimated laser light beam 25 then passes through lenses 31 and 33 of collimator 27, which reconstructs collimated laser light beam 25 so as to form laser light beam 29, the beam diameter of which is identical to that of laser light beam 13. The directional deviation of laser light beam 13 is translated by the collimator coupling of the subject invention into power deviations within laser light beam 29, the power curve of which, at the optical output of collimator 27, is similar to that illustrated in FIG. 2A.

Figure 2:
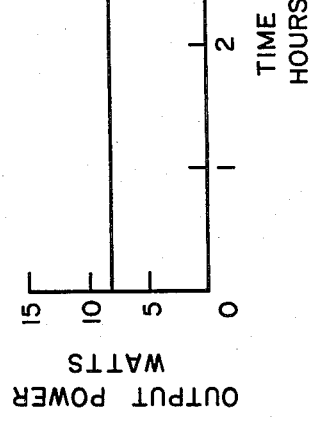
FIGS. 2(A) and 2(B) are waveform diagrams of the monochromatic laser light beam generated by the subject invention taken at various points along the optical light path of FIG. 1.
Figure 2:
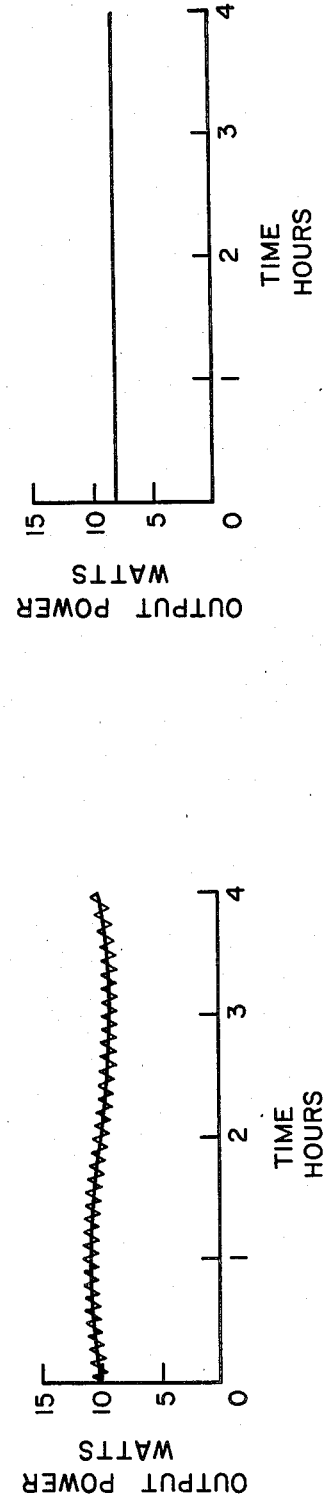

Laser light beam 29 then passes through servomechanism 35 which removes from laser light beam 29 any power level deviations and noise inherent therein such that the power curve of laser light beam 29, at the optical output of servomechanism 35, is similar to that illustrated in FIG. 2B.

Laser light beam 29 then passes through acousto-optic modulator 38 which combines the aforementioned laser light beam with the video signal provided by video signal generator 41 so as to form image transmitting laser light beam 39. Laser light beam 39 is, in turn, transmitted along optical light path 15 to image projecting means, not shown, which broadcast laser light beam 39 on the aforementioned reflective display screen, not shown, so as to form a visual image thereon.

From the foregoing, it may readily be seen that the subject invention comprises a new, unique, and exceedingly useful laser beam directional deviation and noise stabilization device which constitutes a considerable improvement over the known prior art. Obviously, many modifications and variations of the present invention are possible in light of the above teachings. It is, therefore, to be understood that within the scope of the appended claims the inventions may be practiced otherwise than as specifically described.

What is claimed is:

1. A laser beam directional deviation and noise stabilization device comprising, in combination:
    means for projecting a monochromatic first light beam along a predetermined light path, said monochromatic first light beam having a predetermined beam diameter;
    means spatially disposed from said first light beam projecting means on said predetermined light path for collimating said monochromatic first light beam so as to form a collimated monochromatic second light beam, said collimated monochromatic second light beam having removed therefrom any beam directional deviation inherent within said monochromatic first light beam;
    means spatially disposed from said collimating means on said predetermined light path for reconstructing said collimated monochromatic second light beam so as to form a monochromatic third light beam, said monochromatic third light beam having a beam diameter the same as the beam diameter of said monochromatic first light beam without the beam directional deviations inherent within said monochromatic first light beam; and
    stabilizing means spatially disposed from said reconstructing means on said predetermined light path for maintaining the output power of said monochromatic third light beam at a constant value by eliminating from said monochromatic third light beam any power level deviations and noise inherent within said monochromatic third light beam.

2. The device according to claim 1, wherein said first light beam projecting means comprises a laser.

3. The device according to claim 1, wherein said collimating means comprises a spatially filtered collimator.

4. The device according to claim 1, wherein said reconstructing means comprises a Galilean collimator.

5. The device according to claim 1, wherein said stabilizing means comprises a broadband electro-optic feedback loop servomechanism.

6. The device according to claim 1, further characterized by means effectively connected to each of the elements thereof for the mounting and supporting thereof in predetermined relative dispositions respectively.

7. The device according to claim 1, further characterized by:
    an acousto-optic modulator spatially disposed from said stabilizing means on said predetermined light path, said acousto-optic modulator having an input; and
    a video signal generator having an output connected to the input of said acousto-optic modulator.

8. An apparatus having a plurality of optical elements disposed along a predetermined optical path for removing from a monochromatic laser light beam broadcast along said predetermined optical light path any directional deviation inherent therein, and for stabilizing the output power of said monochromatic laser light beam comprising, in combination:
    a spatially filtered collimator disposed on said predetermined optical path;

a Galilean collimator spatially disposed downstream from said spatially filtered collimator on said predetermined optical path; and a broadband electro-optic feedback loop servomechanism spatially disposed downstream from said Galilean collimator on said predetermined optical path.

9. The apparatus of claim 8 further characterized by a laser spatially disposed upstream from said spatially filtered collimator on said predetermined optical path for broadcasting said monochromatic laser light beam on said predetermined optical path.

10. The apparatus of claim 8 further characterized by a mounting and support apparatus effectively connected to each of the optical elements thereof.

11. The apparatus of claim 8 further characterized by:

an acousto-optic modulator spatially disposed downstream from said broadband electro-optic feedback loop servomechanism, said acousto-optic modulator having an input; and a video signal generator having an input connected to the output of said acousto-optic modulator.

* * * * *